(12) United States Patent
Brown

(10) Patent No.: US 7,126,530 B2
(45) Date of Patent: Oct. 24, 2006

(54) NON-COHERENT HIGH-POWER DIRECTED-ENERGY SYSTEM AND METHOD

(75) Inventor: Kenneth W Brown, Yucaipa, CA (US)

(73) Assignee: Raytheon Company, Waltham, MA (US)

( * ) Notice: Subject to any disclaimer, the term of this patent is extended or adjusted under 35 U.S.C. 154(b) by 375 days.

(21) Appl. No.: 10/827,794

(22) Filed: Apr. 20, 2004

(65) Prior Publication Data

US 2005/0231041 A1    Oct. 20, 2005

(51) Int. Cl.
*H01Q 3/00* (2006.01)
(52) U.S. Cl. ..................................... 342/359
(58) Field of Classification Search ............... 342/367, 342/359
See application file for complete search history.

(56) References Cited

U.S. PATENT DOCUMENTS

| | | | |
|---|---|---|---|
| 4,031,488 A * | 6/1977 | Beno ..................... 333/21 A |
| 4,149,167 A * | 4/1979 | Peters et al. ................ 342/14 |
| 4,394,660 A | 7/1983 | Cohen et al. | |
| 4,683,474 A * | 7/1987 | Randig ..................... 342/368 |
| 4,704,732 A * | 11/1987 | Csonka .................... 455/12.1 |
| 4,755,829 A | 7/1988 | Dinger et al. | |
| 5,225,839 A | 7/1993 | Okurowski et al. | |
| 5,455,593 A | 10/1995 | Ross et al. | |

* cited by examiner

*Primary Examiner*—Gregory C. Issing
(74) *Attorney, Agent, or Firm*—Thomas J. Finn; Leonard A. Aikov; Karl A. Vick

(57) ABSTRACT

A directed-energy system includes a plurality of non-coherent microwave sources and a plurality of antennas. Each antenna may be coupled to a corresponding one or more of the sources to radiate energy from the sources and cumulatively generate high-energy pulses based on statistical combining of the energy radiated from the antennas. The pulses may statistically occur at an average rate approximately equal to a frequency spread between the sources divided by twice a number of sources comprising the plurality. In some embodiments, the sources may separately generate horizontally and vertically polarized energy to separately generate high-energy pulses from the statistical combining of the horizontally and vertically polarized energy. In some embodiments, the frequency spread between the sources may be controlled to change the average rate at which the pulses statistically occur. In some embodiments, the frequency spread between the sources may be controlled to change a pulse-width of the pulses. In some embodiments, gimbals may be used to control the direction of the energy.

23 Claims, 4 Drawing Sheets

NON-COHERENT HIGH-POWER DIRECTED-ENERGY SYSTEM AND METHOD

TECHNICAL FIELD

Embodiments of the present invention pertain to high-power microwave systems. In some embodiments, the present invention pertains to directed-energy systems.

BACKGROUND

Some conventional directed-energy systems use a single high-power microwave source fed into a high-gain antenna to generate directed-energy. High-power microwave sources, such as Klystrons, are very expensive, require high-voltages to operate, tend to be fragile, large and bulky, and may require separate support systems, such as a cooling system.

Some other convention directed-energy systems use a very large number of coherent lower-power microwave sources in which coherent energy is combined with an array antenna. One problem with these techniques is that coherent microwave sources are expensive and complex, generally utilizing a feed network to distribute a frequency reference to each of the sources.

Thus, there are general needs for high-power microwave systems and methods for generating high-power directed energy that are less expensive and do not require coherent generators. There are also general needs for high-power microwave systems and methods for generating high-power directed energy that do not require high-voltages, may be more durable, smaller and less bulky, and/or do not require separate support systems, such as a cooling system.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
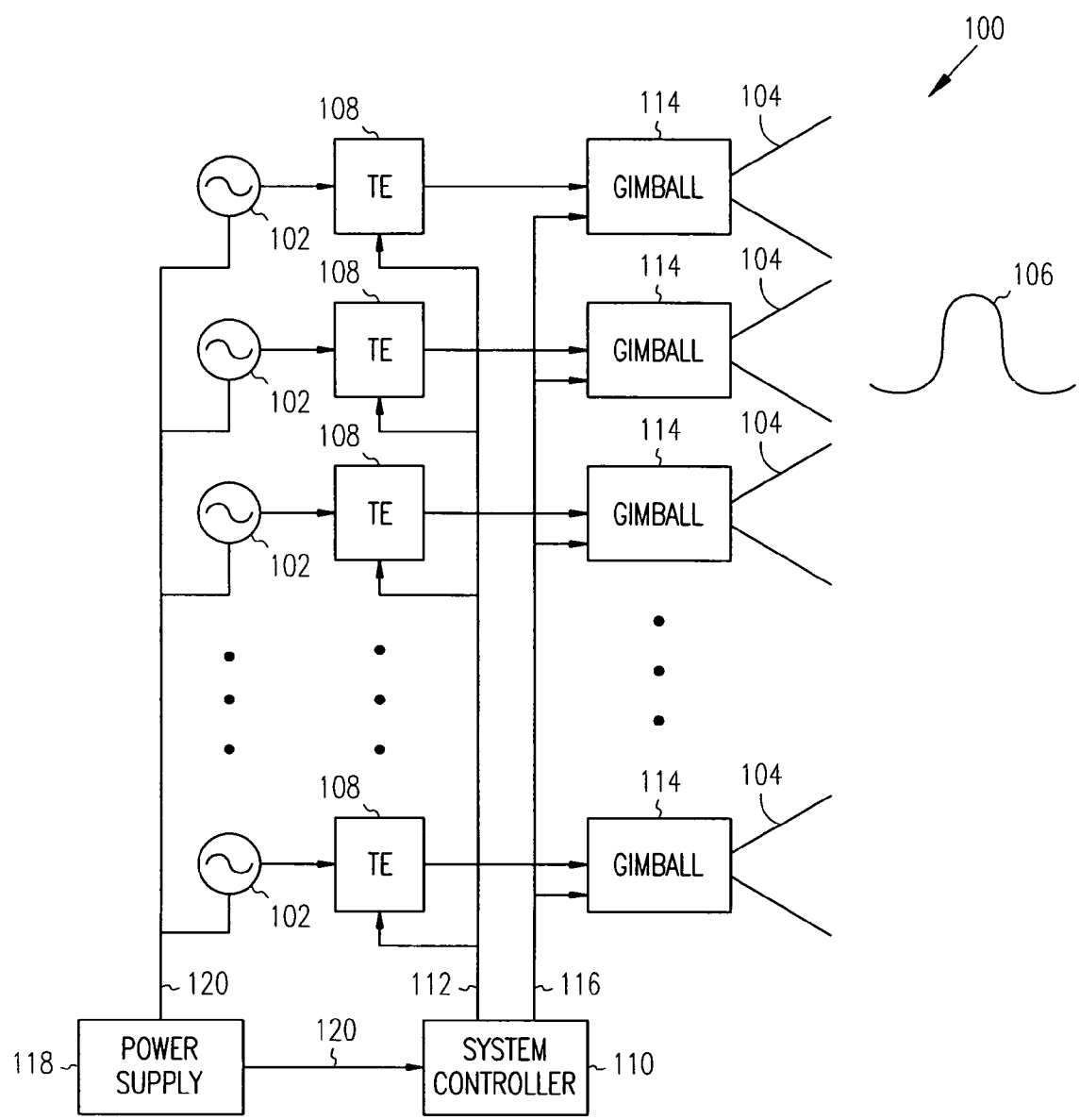
FIG. 1 is a functional block diagram of a directed-energy system in accordance with some embodiments of the present invention.

FIG. 1 is a functional block diagram of a directed-energy system in accordance with some embodiments of the present invention. Directed-energy system 100 includes a plurality of non-coherent microwave sources 102 and a plurality of antennas 104. Each antenna 104 may be coupled to a corresponding one or more of the sources to radiate energy from the sources and cumulatively generate high-energy pulses 106 based on statistical combining of the energy radiated from the antennas.

In some embodiments, pulses 106 may be electromagnetic (EM) pulses and may statistically occur at an average rate approximately equal to a frequency spread between the sources divided by twice the number of sources, although the scope of the invention is not limited in this respect. In some embodiments, pulses 106 may have a pulse-width of approximately two divided by a frequency spread between the sources, although the scope of the invention is not limited in this respect. In some embodiments, pulses 106 may have a peak energy density approximately proportional to the number of sources squared, although the scope of the invention is not limited in this respect.

In some embodiments, pulses 106 may statistically occur at a pulse repetition rate (PRR) approximately equal to the frequency spread between the sources divided by twice the number of sources. In some embodiments, high-energy pulses 106 may be spatially generated based on a random combining (i.e., combining in space/air) of the energy radiated from antennas 104.

In some embodiments, sources 102 may generate electromagnetic energy at almost any microwave or millimeter-wave frequency. In some embodiments, sources 102 generate electromagnetic energy at a frequency approximately between 2.3 and 2.5 GHz, although the scope of the invention is not limited in this respect. Other frequencies, such as 915 MHz, may also be suitable, although the scope of the invention is not limited in this respect.

In some embodiments, the frequency spread between sources 102 may refer to the difference in frequency output between any of the sources that are transmitting. For example, in some embodiments, when the sources generate signals within 1 MHz of a selected center frequency, the frequency spread between the sources would be 2 MHz, although the scope of the invention is not limited in this respect.

In some embodiments, sources 102 may comprise magnetrons. In some other embodiments, sources 102 may comprise solid-state power amplifiers, gyrotrons, traveling wave tubes (TWTs), and/or klystrons configured to generate non-coherent energy. In some embodiments, each source 102 may be a lower-power source and may generate energy levels of approximately 1 kilowatt kW to approximately 50 kW or greater, although the scope of the invention is not limited in this respect. In some embodiments, magnetrons from commercially available microwave ovens may be used for sources 102. In some embodiments, up to 100 or more sources may be used.

In some embodiments, system 100 may generate average power densities based on the number of antenna-source combinations (N), the gain of the antennas (G), the power from each source (P), and the distance from the sources or range (R). In these embodiments, the average power density may be approximately proportional to $NPG/4\pi R^2$, although the scope of the invention is not limited in this respect. Pulses 106 may have a peak power density approximately proportional to $N^2 PG/4\pi R^2$ because of the statistical combining, although the scope of the invention is not limited in this respect. In some embodiments, pulses 106 may randomly occur anywhere within the beamwidth of system 100. In some embodiments, system 100 may radiate within a beamwidth that may be set by any one of antennas 104 providing a much greater beamwidth than a coherent system whose beamwidth may be set by the entire array. This greater beamwidth allows system 100 to radiate pulses 106 over a much larger area that a coherent system. In some embodiments, system 100 may generate high-peak, short duration pulses over a larger area, although the scope of the invention is not limited in this respect.

In some example embodiments, when 50 antenna-source combinations are used with antennas having a gain of 10 with 10 kW sources, system 100 may generate pulses 106 having a peak power density of up to 20,000 kW per square centimeter at a range of 100 meters, although the scope of the invention is not limited in this respect. In some other example embodiments, when 10 antenna-source combinations are used with antennas having a gain of 10 with 10 kW sources, system 100 may generate pulses 106 having a peak power density of up to 850 kW per square centimeter at a range of 100 meters, although the scope of the invention is not limited in this respect.

In some embodiments, antennas 104 may be circularly polarized and may radiate substantially circularly polarized signals. In other embodiments, antennas 104 may be linearly polarized and may radiate signals with a linear polarization (e.g., a horizontal and/or a vertical polarization). Although system 100 is illustrated with separate antennas 104, this is not a requirement. In other embodiments, a single antenna with multiple inputs may be used. In these other embodiments, the multiple inputs may be isolated by polarization and/or frequency. Antennas, such as horns, lenses, arrays, and reflectors may be suitable in some of these embodiments.

In some embodiments, system 100 may comprise one or more tuning elements (TE) 108 coupled between at least some of sources 102 and a corresponding one of antennas 104. Tuning elements 108 may shift at least slightly a frequency of the energy provided by an associated one of sources 102. This may change the frequency spread between the sources which may change the average rate at which pulses 106 statistically occur. In some embodiments, tuning elements 108 may be used to control the frequency of a free-running oscillator within sources 102, although the scope of the invention is not limited in this respect. Examples of some tuning elements suitable for use as tuning elements 108 may include slide tuners and E-H tuners.

In some embodiments, system 100 may also include system controller 110 to generate control signals 112 for tuning elements 108. Control signals 112 may be used to change the frequency spread between the sources to control the average rate at which pulses 106 statistically occur, although the scope of the invention is not limited in this respect. Control signals 112 may also be used to change the frequency spread between the sources to control a pulse-width of pulses 106, although the scope of the invention is not limited in this respect.

In some embodiments, system 100 may also include one or more gimbals 114 coupled to the antennas to direct antennas 104 in a selected direction. In some embodiments, system controller 110 may generate control signals 116 to control gimbals 114 to direct antennas 104 in a selected direction. In some embodiments, each antenna 104 may be coupled to one gimbal 114. In other embodiments, a single gimbal may be used and may be coupled more than one or even all of antennas 104.

In some embodiments, system 100 may include power supply 118 to supply power to sources 102 as well as to system controller 110 and other elements. In some embodiments, power supply 118 may be a portable power supply, such as batteries and/or electric generators. In some embodiments, power supply 118 may be a fixed power supply, such as house current or other power sources.

Although system 100 is illustrated as having several separate functional elements, one or more of the functional elements may be combined and may be implemented by combinations of software-configured elements, such as processing elements including digital signal processors DSPs, and/or other hardware elements. For example, system controller 110 may comprise one or more microprocessors, DSPs, application specific integrated circuits ASICs, and combinations of various hardware and logic circuitry for performing at least the functions described herein.

Figure 2:
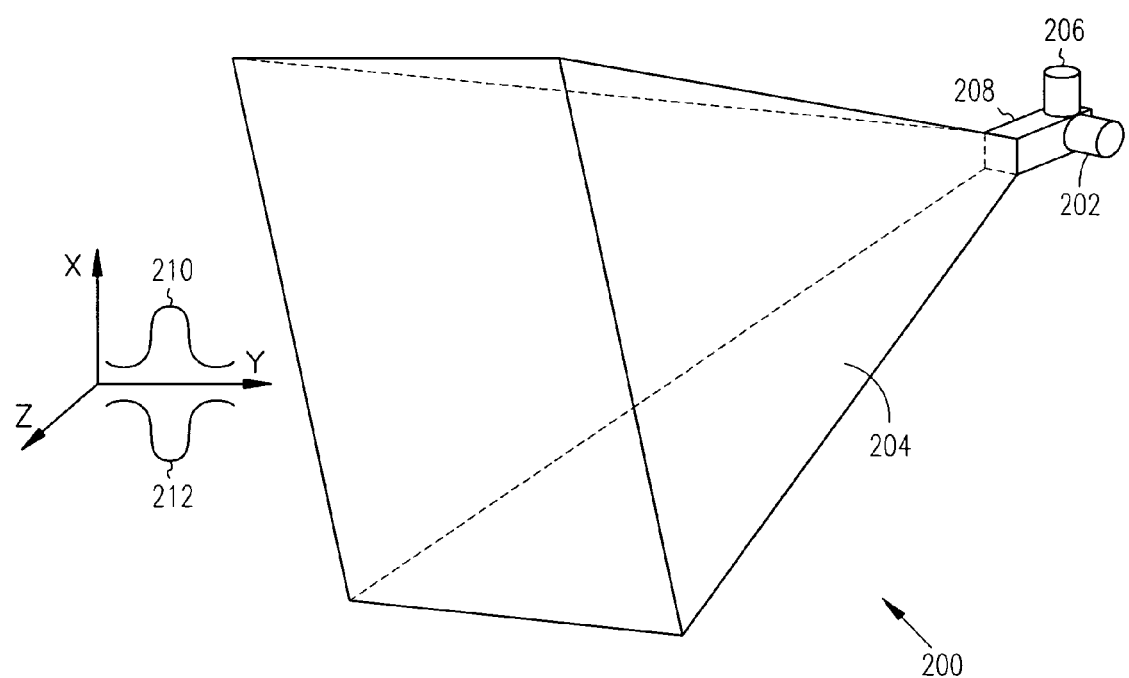
FIG. 2 is a functional block diagram of an antenna-source combination in accordance with some embodiments of the present invention.

FIG. 2 is a functional block diagram of an antenna-source combination in accordance with some embodiments of the present invention. Antenna-source combination 200 is an example of an antenna-source combination that may be suitable for use as one or more of sources 102 (FIG. 1) and a corresponding one of antennas 104 (FIG. 1), although other antenna-source combinations may also be suitable.

Antenna-source combination 200 comprises horn antenna 204 associated with waveguide 208. In these embodiments, sources 202 are coupled to waveguide 208 to generate energy waveforms having a first polarization, and sources 206 are coupled to waveguide 208 to generate energy waveforms having a second polarization. In some embodiments, the energy waveforms having the first polarization randomly combine in space to provide pulses 210 of the first polarization. In these embodiments, the energy waveforms having the second polarization may randomly combine in space to provide pulses 212 of the second polarization. In some embodiments, the first polarization may be substantially orthogonal to the second polarization. In some embodiments, the first polarization may be a vertical polarization and the second polarization may be a horizontal polarization, although the scope of the present invention is not limited in this respect.

In some embodiments, sources 202 and/or sources 206 may correspond to sources 102 (FIG. 1). In some embodiments, sources 202 may comprise magnetrons coupled to a vertical portion of waveguide 208 to generate horizontally polarized waveforms 212, and sources 206 may comprise magnetrons coupled to a horizontal portion of waveguide 208 to generate vertically polarized energy waveforms, although the scope of the invention is not limited in this respect. In other embodiments, sources 202 may be magnetrons configured to generate horizontally polarized waveforms, and sources 206 may be magnetrons configured to generate vertically polarized waveforms.

Although antenna-source combination 200 illustrates horn antenna 204, waveguide 208 and sources 202 and 206 for generating waveforms with substantially orthogonal polarizations, the scope of the invention is not limited in this respect. Other antenna-source combinations may also be used to generate waveforms with substantially orthogonal polarizations, as well as other polarizations including circular polarizations.

Figure 3:
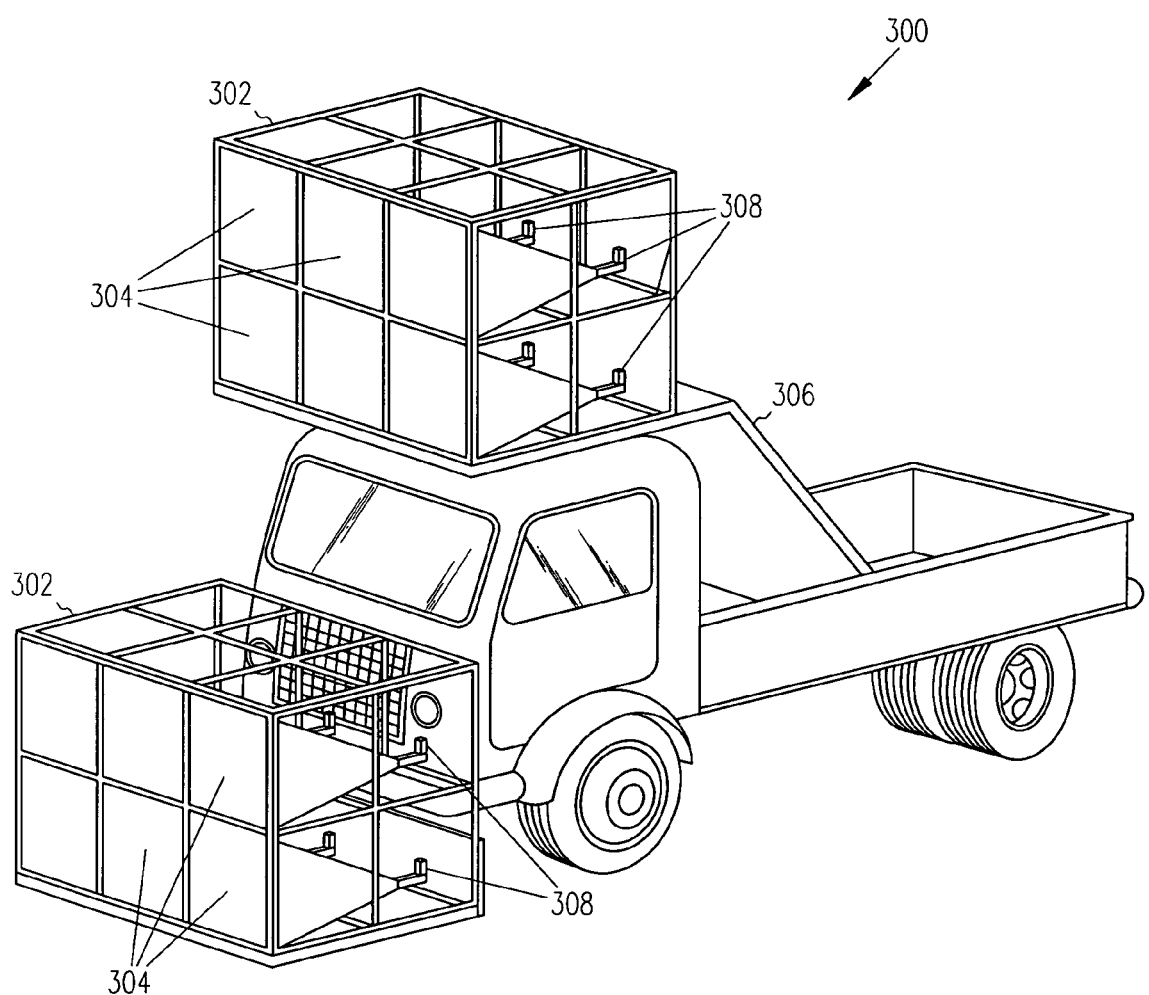
FIG. 3 illustrates a mobile directed-energy system in accordance with some embodiments of the present invention.

FIG. 3 illustrates a mobile directed-energy system in accordance with some embodiments of the present invention. Mobile directed-energy system 300 may comprise directed-energy system 302 located on vehicle 306. System 302 may comprise a plurality of non-coherent radiating sources 308 which may cumulatively generate high-energy pulses based on a statistical combining of the non-coherent energy radiated from antennas 304. In some embodiments, directed-energy system 100 (FIG. 1) may be suitable for use as system 302, although the scope of the invention is not limited in this respect. In some embodiments, antenna-source combination 200 (FIG. 2) may be suitable for use as any or all of non-coherent radiating sources 308 and antennas 304, although the scope of the invention is not limited in this respect. In some embodiments, mobile directed-energy system 300 may also include gimbals (not illustrated in FIG. 3), such as gimbals 114 (FIG. 1), to point antennas 304 in about the same direction and/or direct antennas 304 in a selected direction.

Figure 4:
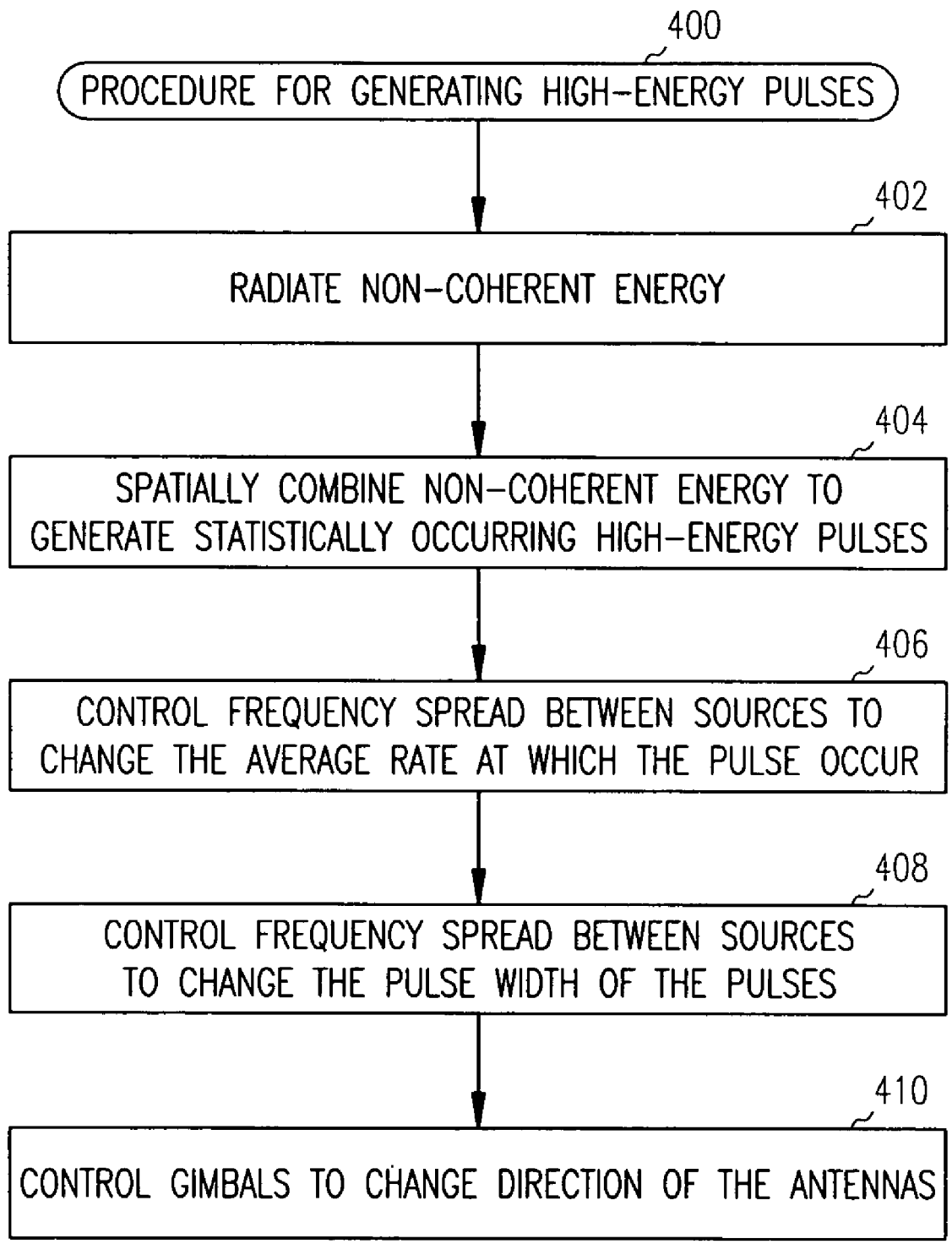
FIG. 4 is a flow chart of a procedure for generating high-energy pulses in accordance with some embodiments of the present invention.

FIG. 4 is a flow chart of a procedure for generating high-energy pulses in accordance with some embodiments of the present invention. Procedure 400 may be performed by a directed-energy system, such as system 100 (FIG. 1), although other systems may also be suitable for performing procedure 400. Procedure 400 may be used to generate statistically occurring high-energy pulses using a number of non-coherent sources.

Operation 402 comprises radiating non-coherent electromagnetic energy with a plurality of non-coherent microwave sources. In some embodiments, operation 402 comprises radiating the non-coherent electromagnetic energy with a plurality of antennas in which each antenna is coupled to a corresponding one of the sources. Because the sources are non-coherent, the sources may have a frequency separation therebetween.

Operation 404 comprises spatially combining the radiated non-coherent energy to generate statistically occurring high-energy pulses. In some embodiments, the pulses may statistically occur at an average rate approximately equal to a frequency spread between the sources divided by twice the number of sources comprising the plurality, although the scope of the invention is not limited in this respect.

Operation 406 comprises controlling the frequency spread between the sources to change the average rate at which the pulses statistically occur. In some embodiments, operation 406 may be optional.

Operation 408 comprises controlling the frequency spread between the sources to change a pulse-width of the pulses. In some embodiments, operation 408 may be optional.

Operation 410 comprises controlling one or more gimbals coupled to the antennas to direct the energy in a selected direction. In some embodiments, operation 410 may be optional.

Although the individual operations of procedure 400 are illustrated and described as separate operations, one or more of the individual operations may be performed concurrently, and nothing requires that the operations be performed in the order illustrated. In some embodiments, operations 402 and 404 may be performed substantially concurrently. In these embodiments, because the sources used to perform operation 402 are non-coherent, the combining of energy in operation 404 may occur from the random combining of energy in space/air.

In some embodiments, the present invention provides a method of disrupting electronic devices. In these embodiments, statistically occurring high-energy pulses may be generated by the spatial combining of energy outputs of a plurality of non-coherent microwave sources, such as sources 102 (FIG. 1). The pulses may occur randomly, and in some embodiments, the pulses may occur statistically at an average rate approximately equal to a frequency spread between the sources divided by twice the number of the sources comprising the plurality. In these embodiments, the non-coherent electromagnetic energy may be radiated with a plurality of antennas, and each antenna may be coupled to a corresponding one or more of the sources. In some embodiments, the antennas may be directed with one or more gimbals in a selected direction. In some embodiments, the electronic devices that may be disrupted by the high-energy pulses may include almost any electrical or electronic device, particularly those using semiconductor devices. Examples of some electronic devices that may be disrupted may include computers and computer systems, vehicles, radio communication stations, satellites, navigation systems, etc.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A directed-energy system comprising:
   a plurality of non-coherent microwave sources; and
   a plurality of antennas to radiate energy from a corresponding one of the sources, the plurality of antennas to cumulatively generate high-energy pulses through spatial combining of the radiated energy;
   a tuning element couple between each of the antennas and the corresponding source, the tuning elements to individually shift a frequency of energy provided by the sources to change an average rate at which the pulses statistically occur through the spatial combining by the antennas; and
   a system controller to provide control signals to the tuning elements to change a frequency spread between the sources to control the average rate at which the pulses statistically occur through the spatial combining.

2. The system of claim 1 wherein the pulses are electromagnetic pulses generated by the spatial combining,
   wherein the plurality of sources are at a single location, and
   wherein the control signals provided by the system controller further cause the tuning elements to shift the frequency of a corresponding source to cause the pulses to statistically occur at an average rate approximately equal to a frequency spread between the sources divided by twice a number of sources comprising the plurality.

3. The system of claim 1 wherein the control signals provided by the system controller further cause the tuning elements to shift frequency of the corresponding source to generate pulses through spatial combining having a pulse-width of approximately two divided by a frequency spread between the sources and having a peak energy density approximately proportional to the number of sources squared.

4. The system of claim 1 wherein the sources comprise magnetrons.

5. The system of claim 1 wherein the antennas are circularly polarized and radiate substantially circularly polarized energy.

6. The system of claim 1 wherein the antennas comprise horn antennas,
wherein the plurality of sources comprise sources of a first polarization, each source of the first polarization coupled through the corresponding tuning element to an associated one of the horn antennas to generate energy waveforms having the first polarization,
wherein the system further comprises a second plurality of sources of a second polarization, each source of the second polarization coupled through the corresponding tuning element to an associated one of the horn antennas to generate energy waveforms having the second polarization, and
wherein the first polarization is substantially orthogonal to the second polarization.

7. The system of claim 6 wherein the frequency shifting by the tuning elements coupled to the sources of the first polarization cause the energy waveforms having the first polarization to randomly combine in space to provide pulses of the first polarization, and
wherein the frequency shifting by the tuning elements coupled to the sources of the second polarization cause the energy waveforms having the second polarization randomly combine in space to provide pulses of the second polarization.

8. The system of claim 6 wherein the first polarization comprises a horizontal polarization and the second polarization comprises a vertical polarization.

9. The system of claim 8 wherein the sources of the first polarization comprise magnetrons coupled to a vertical portion of the antennas to generate horizontally polarized waveforms, and
wherein the sources of the second polarization comprise magnetrons coupled to a horizontal portion of the antennas to generate vertically polarized waveforms.

10. The system of claim 2 wherein each source generates power levels of approximately 1 kilowatt (kW) to approximately 100 kW.

11. The system of claim 10 wherein the sources generate electromagnetic energy at a frequency approximately between 2.3 and 2.5 GHz, and
wherein the frequency spread between any of the sources is approximately 2 MHz.

12. The system of claim 1 wherein the control signals provided by the system controller further cause the tuning elements to change the frequency spread between the sources to control a pulse-width of the pulses.

13. The system of claim 1 further comprising one or more gimbals coupled to the antennas to direct the pulses in a selected direction in response to gimbal control signals provided by the system controller.

14. The system of claim 13 wherein each antenna is coupled to one of a plurality of gimbals.

15. The system of claim 13 wherein a single gimbal is coupled to the plurality of antennas.

16. A method of generating high-energy pulses comprising:
radiating non-coherent electromagnetic energy with a plurality of non-coherent microwave sources, the radiated non-coherent energy being spatially combined to generate statistically occurring high-energy pulses; and
shifting a frequency of the energy provided by the sources and changing a frequency spread between the sources to control an average rate at which the pulses statistically occur through the spatial combining.

17. The method of claim 16 wherein the radiating comprises radiating the non-coherent electromagnetic energy wit a plurality of antennas, each antenna coupled to a corresponding one of the sources,
wherein the pulses are electromagnetic pulses, and
wherein the method further comprises providing control signals to tuning elements to shift the frequency provided by the sources to cause the pulses to statistically occur at an average rate approximately equal to the frequency spread between the sources divided by twice a number of the sources comprising the plurality.

18. The method of claim 17 further comprising controlling the frequency spread between the sources to change a pulse-width of the pulses.

19. The method of claim 17 further comprising controlling one or more gimbals coupled to the antennas to direct the energy in a selected direction.

20. The method of claim 17 wherein radiating comprises:
radiating first non-coherent electromagnetic energy with a first plurality of non-coherent microwave sources, the radiated non-coherent energy to spatially combine to generate statistically occurring high-energy pulses having a first polarization; and
radiating second non-coherent electromagnetic energy with a second plurality of non-coherent microwave sources, the radiated non-coherent energy to combine to generate statistically occurring high-energy pulses having a second polarization,
wherein the first polarization is substantially orthogonal to the second polarization.

21. A method of disrupting electronic devices comprising:
generating statistically occurring high-energy pulses by spatially combining outputs of a plurality of non-coherent microwave sources, the pulses to occur statistically at an average rate approximately equal to a frequency spread between the sources divided by twice a number of the sources comprising the plurality; and
shifting a frequency of the energy provided by the sources and changing the frequency spread between the sources to control the average rate at which the pulses statistically occur through the spatial combining.

22. The method of claim 21 wherein the generating comprises radiating non-coherent electromagnetic energy with a plurality of antennas, each antenna coupled to a corresponding one of the sources,
the method further comprising directing the antennas with one or more gimbals in a selected direction.

23. The method of claim 21 further comprising controlling the frequency spread between the sources to change a pulse-width of the pulses.

* * * * *